United States Patent
Combes

(10) Patent No.: US 6,477,977 B1
(45) Date of Patent: Nov. 12, 2002

(54) METHOD AND APPARATUS FOR REPELLING LAND AND WATER FOWL FROM STRUCTURES

(76) Inventor: Furman Combes, 2301 Crest Lane Dr., Smyrna, GA (US) 30080

( * ) Notice: Subject to any disclaimer, the term of this patent is extended or adjusted under 35 U.S.C. 154(b) by 0 days.

(21) Appl. No.: 09/965,178

(22) Filed: Sep. 27, 2001

(51) Int. Cl.⁷ ............................................. B63B 17/00
(52) U.S. Cl. ...................................... 114/343; 52/101
(58) Field of Search ..................... 248/68.1; 114/255, 114/343; 441/1; 52/101

(56) References Cited

U.S. PATENT DOCUMENTS

| | | | |
|---|---|---|---|
| 3,416,266 A | * 12/1968 | Eron | 52/101 |
| 4,682,747 A | * 7/1987 | King et al. | 174/45 R |
| 4,862,637 A | 9/1989 | Bressel | |
| 5,092,088 A | 3/1992 | Way | |
| 5,261,179 A | 11/1993 | Schwinler | |
| 5,341,759 A | 8/1994 | Hood | |
| 5,476,062 A | 12/1995 | Ondris | |
| 5,713,160 A | 2/1998 | Hevon | |
| 5,918,404 A | 7/1999 | Ohba | |
| 6,003,471 A | 12/1999 | Ohba | |
| 2001/0048053 A1 | * 12/2001 | Donoho | 248/68.1 |

FOREIGN PATENT DOCUMENTS

| | | | | |
|---|---|---|---|---|
| GB | 02080676 | * | 2/1982 | |
| GB | 02237826 A | * | 5/1991 | 52/101 |

* cited by examiner

Primary Examiner—Stephen Avila
(74) Attorney, Agent, or Firm—Patent Focus, Inc.; Richard C. McComas

(57) ABSTRACT

A waterfowl repelling mechanism is an elongated rectangular member that has a C-shaped member connected at one end. The other end of the elongated rectangular member has a slot disposed therein. The C-shaped member partially surrounds a rounded railing of a marine craft with the elongated member extending upward. A narrow diameter flexible material is positioned between successively mounted repelling mechanisms, drawn tight and secured.

A land fowl repelling mechanism is mounted onto a flat structure. The repelling mechanism is an elongated rectangular member that has a first end. The first end has an aperture disposed therein. The elongated rectangular member has a second end oppositely spaced from the first end. A mounting platform is connected to the elongated rectangular member's second end. The platform is mounted to the flat structure and a flexible material is threaded between successively mounted elongated rectangular members's apertures and secured thereto.

8 Claims, 2 Drawing Sheets

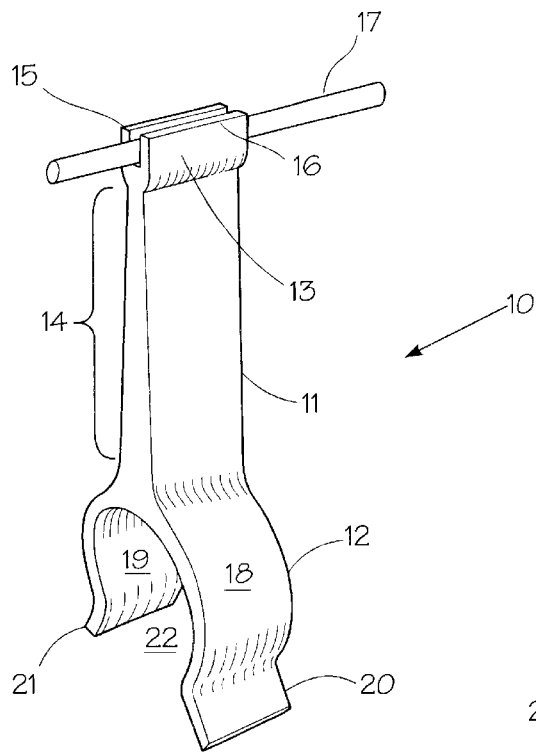
Fig. 1
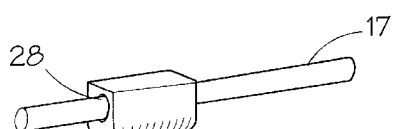
Fig. 2
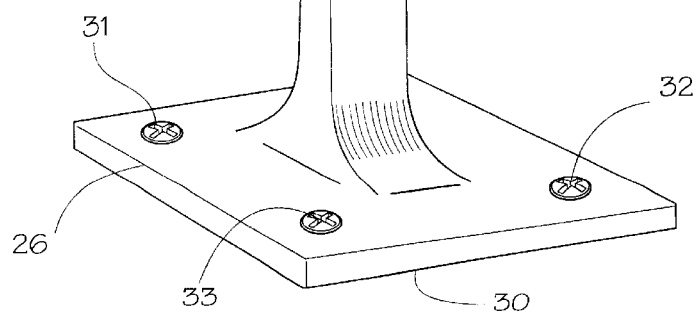

METHOD AND APPARATUS FOR REPELLING LAND AND WATER FOWL FROM STRUCTURES

FIELD OF THE INVENTION

The invention relates, in general, to a mechanism mountable on marine craft or other structure for preventing water and land fowl from landing thereon. In particular, the invention relates to a plurality of repelling mechanisms mounted on a marine craft's railing or other types of structure for preventing water and land fowl from landing thereon.

BACKGROUND OF THE INVENTION

Water or land fowl tend to roost or perch on the highest elevation or the most distant part of a structure. It can be surmised that water and land fowl choose these types of roosting locations for safety reasons. Another reason may be higher elevations have more frequent up drafts thus aiding the water and land fowl to take off from the structure. Marine craft of various configurations and sizes have common features. Generally, marine craft have railings or support structures around the perimeter of the outermost structure of the craft. If the marine craft is multilevel, the elevated decks generally have railings or support structures around the perimeter of the outermost structure of the elevated deck.

Waterfowl, while pleasing to watch, cause considerable damage to marine craft and carry numerous diseases that may be transmitted to humans. Attempts in the past to repel waterfowl from marine craft included wires that crisscrossed the structure of the marine craft. While these attempts partially succeeded in repelling waterfowl from marine craft they further complicated the maintenance aboard the marine craft. The crew or individual owner of the marine craft was required to string the wires when the marine craft was docked and remove the wiring when the craft was underway. In some cases the wiring was left in place while the marine craft was underway but as one can imagine the crisscrossing of wires on a marine craft while the craft is underway is detrimental to the safety of those aboard the craft.

It would be desirable to have a water and land fowl repelling mechanism that is uncomplicated to install on marine craft or other structures. The repelling mechanism would be unobtrusive and would not be detrimental to the safety of those aboard the marine craft or in proximity to other types of structures. Desirably, the repelling mechanism would remain in place thereby providing continuous protection for marine craft or other types of structures.

SUMMARY OF THE INVENTION

In general, marine craft have rounded safety railings installed around the perimeter of the topside decks of the craft. The rounded railings serve the purpose of preventing an individual from falling to a lower deck or over the side of the marine craft. The rounded railings on marine craft are the perfect haven for fowl searching for a place to land or perch. The preferred embodiment of the present invention is a mechanism that once installed on the rounded railing of the marine craft repels fowl from landing on the craft. The preferred embodiment of the present invention is installed on the topmost railing of the deck to which the rounded railing is attached. If the marine craft has multiple decks the preferred embodiment of the present invention is mounted on the rounded railing of each deck.

The fowl repelling mechanism is installed on the rounded railing about the perimeter of the marine craft. A narrow diameter flexible material is installed between successively mounted repelling mechanisms. The repelling mechanism is an elongated rectangular member that has a first end. The first end has a slot extending along the topmost portion. The elongated rectangular member has a second end oppositely spaced from the first end. A C-shaped member is connected to the elongated rectangular member's second end at a selected position oppositely spaced from the C-shaped member's opening. A pair of spaced apart oppositely facing elongated flanges are connected to the C-shaped member's opening. The C-shaped member partially surrounds the rounded railing of the marine craft with the elongated member extending upward. The narrow diameter flexible material is positioned between subsequently mounted repelling mechanisms, drawn tight and secured at opposite ends of the flexible material to the rounded railing or to the repelling mechanism.

The second embodiment of the present invention is an extension of the preferred embodiment. The second embodiment of the present invention is a fowl repelling mechanism that may, if desired, be mounted onto flat structures. The flat structure may be the deck of a marine craft, the deck of a patio in a high-rise apartment building or any other type of structure. One or more of the second embodiments of the present invention are installed on the flat structure and a narrow diameter flexible material is threaded through successive second embodiments of the present invention.

The second embodiment of the present invention is an elongated rectangular member that has a first end. The first end has an aperture disposed therein. The elongated rectangular member has a second end oppositely spaced from the first end. A mounting platform is connected to the elongated rectangular member's second end. The platform is mounted to the flat structure and the flexible material is threaded between successively mounted elongated rectangular members's apertures. The flexible material is drawn tight and secured at each end thereby creating a barrier to prevent fowl from landing on the flat structure.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which:

FIG. 1 illustrates a perspective view of the preferred embodiment of the present invention, FIG. 2 illustrates a perspective view of the second embodiment of the present invention.

DETAILED DESCRIPTION OF THE INVENTION

Figure 3:
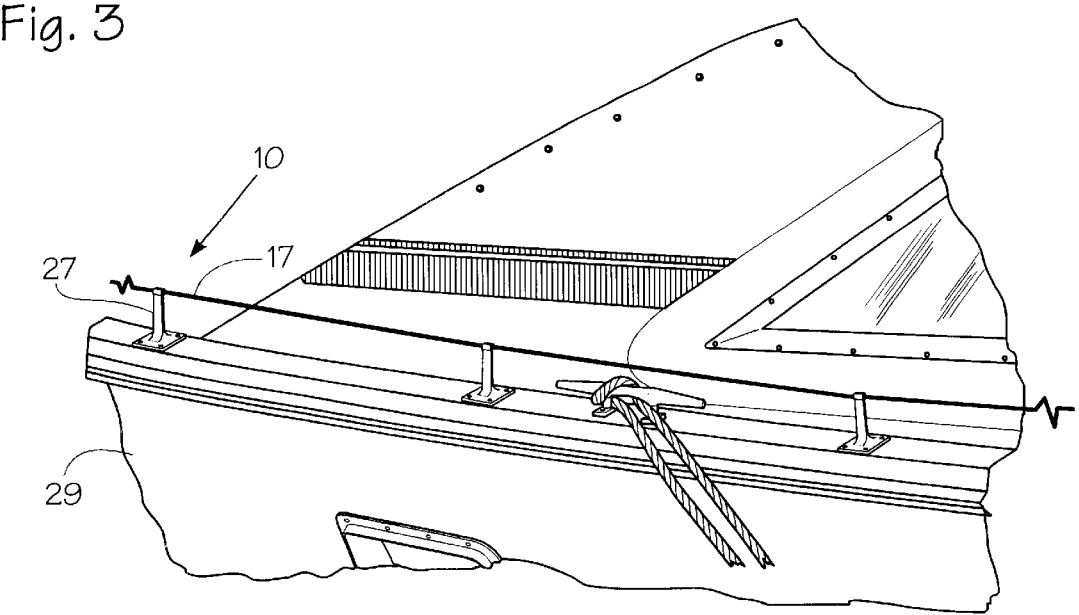
FIG. 3 illustrates a schematic view of the second embodiment of of the present invention in operation.
Figure 4:
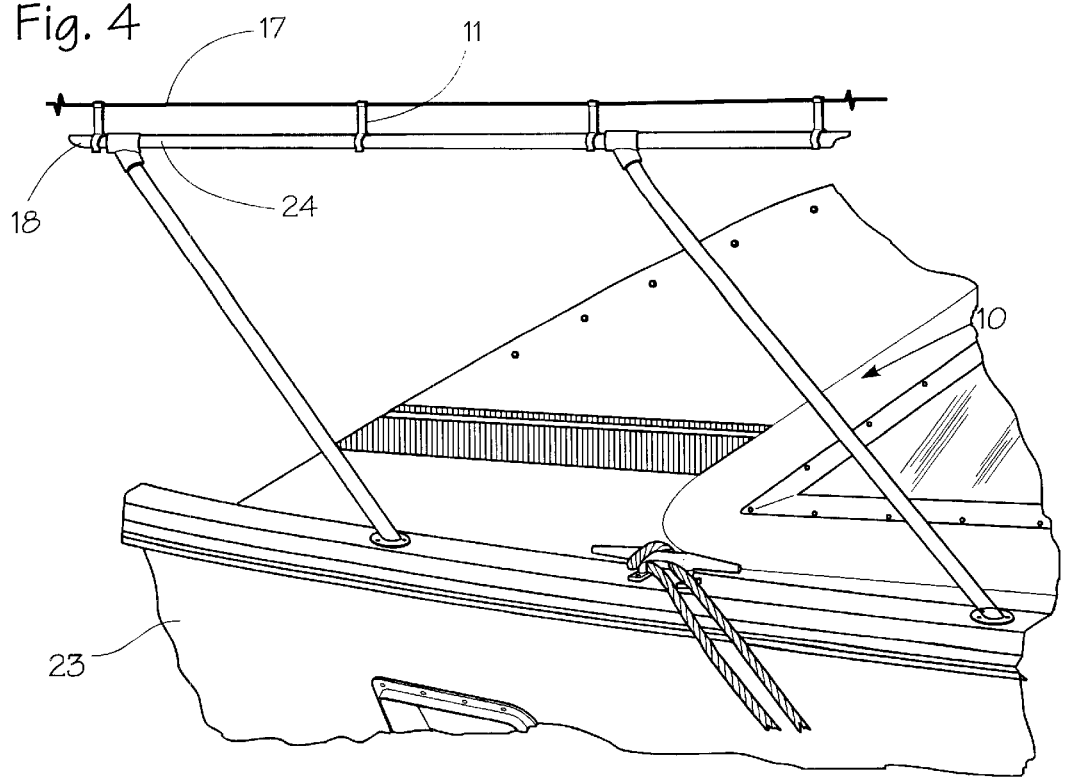
FIG. 4 illustrates a schematic view of the preferred embodiment of the present invention in operation.

An overview of the preferred embodiment of the present invention: In general, marine craft have rounded safety railing installed around the perimeter of the topside deck of the marine craft. The rounded railing serves the purpose of preventing an individual from falling to a lower deck or over the side of the marine craft. The railings on marine craft are a perfect haven for fowl searching for a place to land or perch. The preferred embodiment of the present invention 10, FIG. 1 is a mechanism that once installed on the rounded railing of the marine craft repels fowl from landing on the marine craft. The preferred embodiment of the present invention 10 is installed on the topmost railing of the deck to which the railing is attached. If the marine craft has multiple decks the preferred embodiment of the present invention is mounted on the railing of each deck.

A more detailed discussion of the preferred embodiment of the present invention 10: The preferred embodiment of the present invention 10 has elongated rectangular member 11 having attached at one end a C-shaped member 12. The other end of the elongated member 11 has slot 13 sized to receive a portion of a narrow diameter flexible material 17. The flexible material 17 may, if desired, be a slender length of material fabricated from twisted strands, fibers, or solid material. Examples of flexible materials 17 are wire, cloth, nylon, polyester, fishing-line or any other convenient cord-like materials of various diameters.

The elongated member 11, FIG. 1 may, if desired, be any convenient geometry. For example, the elongated member 11 is substantially rectangular in geometry and if desired, the elongated portion is tapered. The tapered portion 14 extends along the body of the preferred embodiment of the present invention 10. The tapered portion 14 may, if desired, be tapered from top to bottom or it may be tapered from bottom to top. The elongated member 11 may, if desired, be any convenient length. Typically, the length of the elongated member 11 is about 0.50 inches to 10.0 inches. Preferably, the length of the elongated member 11 is 1.5 inches. The slot 13 is positioned on the top portion of the elongated member 11. For example, the slot 13 is disposed along the short side of the rectangular elongated member 11. If desired, the slot 13 may be located anywhere on the elongated member 11. The slot's 13 width may, if desired, be any convenient dimension to receive a portion of the flexible material 17. The slot 13 may, if desired, be reinforced with outer walls 15 and 16 to support the structural end of the elongated member 11. The width of slot 13 has a dimension in the range of about 0.01 inches to 1.0 inches. Preferably, the width of slot 13 has a dimension of about 0.20 inches.

The C-shaped member 12, FIG. 1 has an outer wall 18 and an inner wall 19 forming the C-shaped structure. The inner wall 19 forms an interior aperture with an opening 22 along the C-shaped member 12. A pair of outwardly extending flanges 20 and 21 are connected to the outer and inner walls 18 and 19 respectively at the opening 22 of the C-shaped member 12. The C-shaped member is connected to the elongated member 11 in any convenient position along the outer wall 18. Preferably, the C-shaped member 12 is connected to one end of the elongated member 11 oppositely spaced from the opening 22. The C-shaped member 12 is sized to receive a portion of the perimeter-rounded railing of the marine craft. The C-shaped member's 12 interior aperture may, if desired, be any convenient geometry or configuration to receive varying geometries of marine craft railing. Preferably, the interior aperture partially captured by inner wall 19 is substantially circular.

The elongated member 11 and C-shaped member 12, FIG. 1 may, if desired, be fabricated from any convenient material. Examples of materials are plastic, wood, metal, or nylon. The fabrication process may, if desired, be injection molded or piece part assembled.

In operation, the C-shaped member 12, FIG. 3 is inserted about the perimeter railing 24 of the marine craft 23 with the elongated member 11 projecting outward from the railing 24. If desired, a plurality of preferred embodiments of the present invention 10 may be installed about the perimeter railing of the marine craft 23. The flexible material 17 is inserted into slot 13 of each of the installed preferred embodiments of the present invention 10. The flexible material 17 is drawn tight and secured at each end thereby creating a barrier to prevent fowl from landing on the deck of the marine craft 23.

The second embodiment of the present invention 10, FIG. 2 is a platform version of the preferred embodiment. A platform 26 is connected to an elongated member 27. The elongated member 27 has an aperture 28 disposed at one end. The aperture 28 is sized to receive the flexible material 17.

The platform 26, FIG. 2 may, if desired, be any convenient geometry. Examples of convenient geometries are round, rectangular, oval or any derivation thereof. Preferably, platform 26 is substantially rectangular in shape. The platform 26 may be any convenient thickness to support the elongated member 27. The platform 26 has a bottom surface 30 which may, if desired, be affixed to any flat structure. Although the second embodiment of the present invention 10 is depicted herein as being mounted onto the marine craft 29, FIG. 3 it is understood that the second embodiment of the present invention 10 may, if desired, be mounted onto any type of flat structure. Examples of flat structures are the outer most portion of a patio, balcony or a marine craft 29, FIG. 3 that does not have perimeter railing. The process of affixing the platform 26 to the perimeter structure of the marine craft 29 may, if desired, be adhesive, double sided tape, or epoxy. If desired, the platform 26 may be permanently affixed to the perimeter structure of the marine craft 29 by inserting at least one screw 31 through the platform 26 engaging the structure of the marine craft 29. If desired, a plurality of screws 31, 32 and 33 may be inserted through the platform 26 engaging the structure of the marine craft 29 thereby permanently installing the second embodiment of the present invention 10 to the structure of the marine craft 29 or any other type of flat structure.

The second embodiment of the present invention 10, FIG. 2 i.e., the elongated member 27 and the platform 26 may, if desired, be fabricated from the same or different material as discussed in the preferred embodiment of the present invention 10.

The elongated member 27, FIG. 2 may, if desired, be the same geometry and length as the elongated member 11 or any other convenient geometry and length. The elongated member 27 is connected at one end to the platform 26 in any convenient location. The other end of the elongated member 27 has an aperture 28 therethrough. The aperture 28 is sized to unobstructedly receive the flexible material 17.

In operation, of the second embodiment of the present invention 10, FIG. 3 has the platform 26, FIG. 3 mounted onto the outer perimeter of any type of flat structure. The flexible material 17 is inserted into the aperture 28 of each of the installed second embodiments of the present invention 10. The flexible material 17 is drawn tight and secured at each end thereby creating a barrier to prevent fowl from landing on the flat structure.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A fowl repelling mechanism installed about a selected structure, comprising:
   a) an elongated rectangular member having a first end, said first end having a slot disposed therein;
   b) said elongated rectangular member having a second end oppositely spaced from said first end;
   c) a C-shaped member being connectively disposed in-line with said elongated rectangular member's second end at a position oppositely spaced from said C-shaped member's opening;
   d) said C-shaped member's opening capturing a portion of the selected structure;
   e) a selected flexible material disposed between successively installed repelling mechanisms's first end slots;
   thereby preventing fowl from landing on the selected structure.

2. A fowl repelling mechanism as recited in claim 1 further comprising:
   a) a pair of spaced apart oppositely facing elongated flanges; and
   b) said pair of flanges each having one end connectively disposed to said C-shaped member's opening.

3. A fowl repelling mechanism as recited in claim 2 further comprising reinforced walls disposed on either side of said slot.

4. A fowl repelling mechanism as recited in claim 3 wherein said elongated rectangular member being tapered from said first end to said second end.

5. A fowl repelling mechanism as recited in claim 4 wherein said flanges being selectively angled apart.

6. A fowl repelling mechanism securing a flexible material disposed about the perimeter railing of a marine craft, comprising:
   a) an elongated rectangular member having a first end, said first end having a slot disposed therein;
   b) said elongated rectangular member having a second end oppositely spaced from said first end;
   c) a C-shaped member having an outer wall;
   d) said C-shaped member having an inner wall;
   e) said inner wall surface forming an interior aperture with an opening along said C-shaped member;
   f) a position on said outer wall oppositely spaced from said opening being connectively disposed to said rectangular member's second end;
   g) a pair of oppositely spaced outwardly extending elongated flanges;
   h) said pair of flanges each having one end connectively disposed to said C-shaped member's opening;
   i) said C-shaped member's opening being slidably insertable about the railing;
   j) thereby the railing is captured by said C-shaped wall's inner wall and the flexible material is inserted between successive elongated rectangular members's slots.

7. A method of repelling fowl from the surface of a selected structured the selected structure having a rounded railing disposed about its perimeter, comprising the steps of:
   a) providing an elongated member having a C-shaped member disposed at one end, in an in-line position with said C-shaped member's opening, the other end of said elongated member having a slot disposed therein;
   b) positioning a plurality of said elongated members perpendicular to the rounded railing;
   c) inserting said C-shaped members about the railing;
   d) providing a selected length of flexible material;
   e) disposing said flexible material into successive said elongated members's slots; and
   securing opposite ends of said flexible material.

8. A fowl repelling mechanism installed about a selected structure, comprising:
   a) an elongated rectangular member having a first end, said first end having a slot disposed therein;
   b) said elongated rectangular member having a second end oppositely spaced from said first end;
   c) a C-shaped member having an outer wall, said outer wall being connectively disposed in-line with said elongated rectangular member's second end at a position oppositely spaced from said C-shaped member's opening;
   d) said C-shaped member's opening capturing a portion of the selected structure;
   e) a selected flexible material disposed between successively installed repelling mechanisms's first end slots; thereby preventing fowl from landing on the selected structure.

* * * * *